United States Patent
Matusik et al.

(10) Patent No.: US 12,045,651 B2
(45) Date of Patent: Jul. 23, 2024

(54) LAZY LOADING FOR DESIGN VIEWS SYSTEM AND SERVER

(71) Applicant: AVEVA Software, LLC, Lake Forest, CA (US)

(72) Inventors: Grzegorz Boguslaw Matusik, Banino (PL); Piotr Krzysztof Sydow, Gdynia (PL); Adam Wenecki, Juszkowo (PL)

(73) Assignee: Aveva Software, LLC, Lake Forest, CA (US)

( * ) Notice: Subject to any disclaimer, the term of this patent is extended or adjusted under 35 U.S.C. 154(b) by 0 days.

(21) Appl. No.: 17/513,285

(22) Filed: Oct. 28, 2021

(65) Prior Publication Data

US 2022/0171655 A1   Jun. 2, 2022

Related U.S. Application Data

(63) Continuation of application No. 16/774,747, filed on Jan. 28, 2020, now abandoned.

(60) Provisional application No. 62/798,350, filed on Jan. 29, 2019.

(51) Int. Cl.
*G06F 9/50* (2006.01)
*G06F 9/445* (2018.01)
*G06F 9/455* (2018.01)
*G06T 15/00* (2011.01)

(52) U.S. Cl.
CPC ........ *G06F 9/5005* (2013.01); *G06F 9/44505* (2013.01); *G06F 9/45508* (2013.01); *G06T 15/005* (2013.01)

(58) Field of Classification Search
CPC ............ G06T 15/005; G06T 19/00–20; G06F 9/5005; G06F 9/44505; G06F 9/45508; G06F 8/20; G06F 8/38; G06F 30/20
See application file for complete search history.

(56) References Cited

U.S. PATENT DOCUMENTS

| | | |
|---|---|---|
| 9,865,085 B1 | 1/2018 | Eng et al. |
| 2007/0050412 A1 | 3/2007 | Robertson et al. |
| 2009/0237411 A1 | 9/2009 | Gossweiler et al. |

(Continued)

FOREIGN PATENT DOCUMENTS

WO   2017123163 A1   7/2017

OTHER PUBLICATIONS

Ruthensteiner, Bernhard, and Martin Heß. "Embedding 3D models of biological specimens in PDF publications." Microscopy research and technique 71.11 (2008): 778-786. (Year: 2008).*

(Continued)

*Primary Examiner* — Daniel F Hajnik
(74) *Attorney, Agent, or Firm* — Dergosits & Noah LLP; Todd A. Noah

(57) ABSTRACT

Systems and methods for improving 2D and/or 3D model execution in a runtime environment are disclosed. The system uses a novel form of lazy loading to limit the amount of computer resources used when initially viewing a model or drawing. The system also allows for setting which components of a rendering software to load/not load when a model file is selected. The system provides a picture of the a 2D and/or 3D model view in place of the full model upon selection of the model file, and additional attributes and/or rendering software components are called as needed as part of the lazy loading execution when the model is loaded into the runtime environment.

18 Claims, 1 Drawing Sheet

(56) References Cited

U.S. PATENT DOCUMENTS

| | | |
|---|---|---|
| 2010/0253697 A1 | 10/2010 | Rivera |
| 2012/0105449 A1 | 5/2012 | Buchowski et al. |
| 2013/0127858 A1 | 5/2013 | Leroy et al. |
| 2013/0257856 A1 | 10/2013 | Hickman et al. |
| 2015/0161823 A1 | 6/2015 | Anderson-Sprecher et al. |
| 2016/0189688 A1 | 6/2016 | Morein |
| 2017/0213379 A1 | 7/2017 | Baldwin et al. |
| 2018/0315238 A1 | 11/2018 | Le Doux et al. |

OTHER PUBLICATIONS

NPL Video Titled "Opening and Navigating PDFs in Reader—Adobe Acrobat XI Training Tutorial Course", Published Jul. 2014, available for viewing at: https://www.youtube.com/watch?v=J98C1aySI9Q; select screenshots included. (Year: 2014).*

International Search Report and Written Opinion mailed on Sep. 3, 2020 for PCT application No. PCT/US2020/015418 (10 pages).

Anonymous, Loading React Components Dynamically on Demand Using React Lazy, Oct. 28, 2018, whole document.

EESR from European Patent Appln. No. 20747867.8 dated Jan. 9, 2023.

* cited by examiner

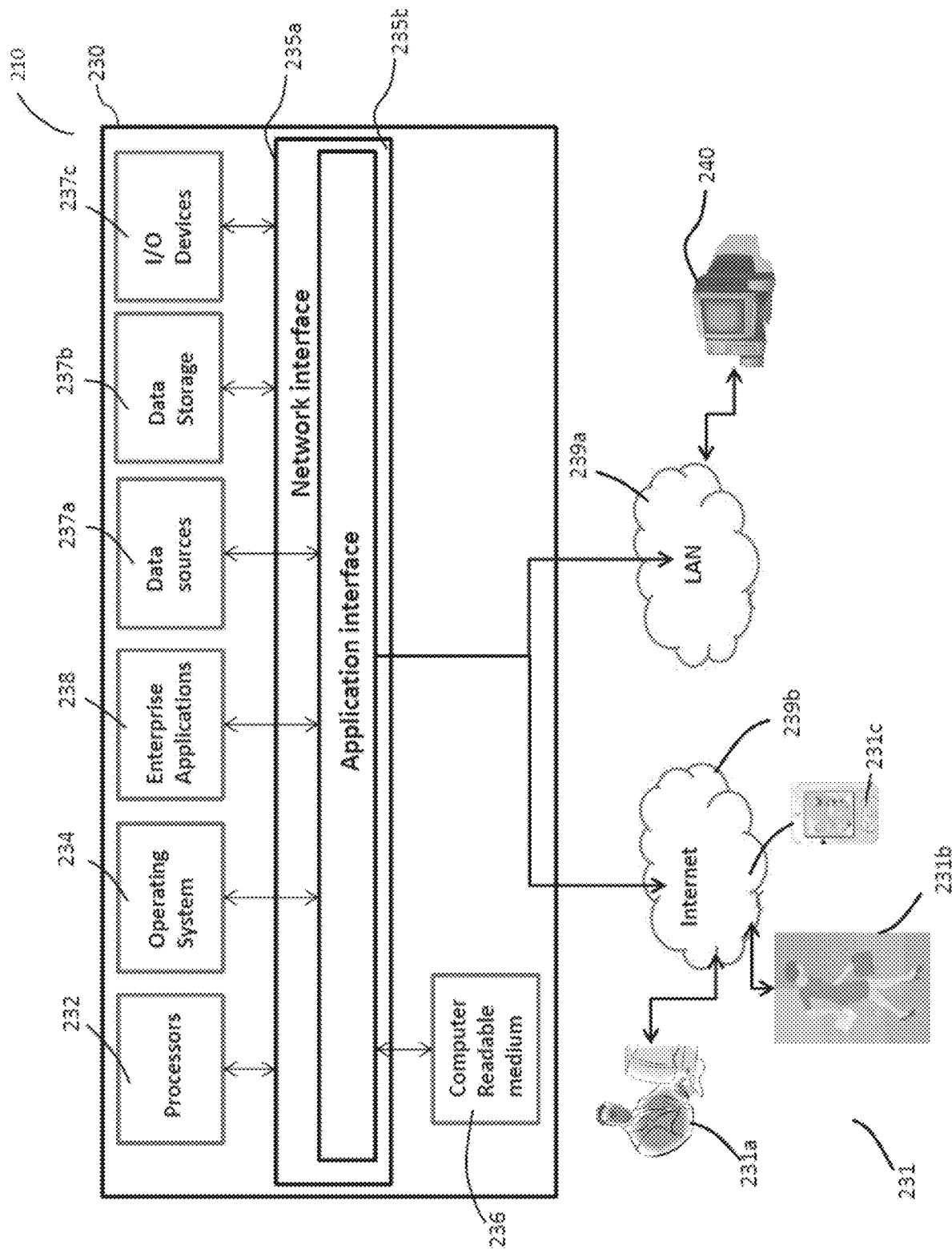

LAZY LOADING FOR DESIGN VIEWS SYSTEM AND SERVER

CROSS-REFERENCE TO RELATED APPLICATIONS

This application is a Continuation Application of U.S. patent application Ser. No. 16/774,747, filed Jan. 28, 2020, entitled, "LAZY LOADING FOR DESIGN VIEWS SYSTEM AND SERVER", which claims the benefit of and priority to U.S. Provisional Application No. 62/798,350, filed Jan. 29, 2019, entitled, "LAZY LOADING FOR DESIGN VIEWS SYSTEM AND SERVER", the entire contents of which are incorporated herein by reference.

BACKGROUND 3D models generated by industrial control and monitoring software platforms are growing larger and more complex, leading to an increase in the hardware requirements of any device attempting to access, load, and visualize data. For example, ship and plant design engineers often create large drawings with multiple views sometimes containing an entire ship or process plant. In many cases, these are larger than AO in size (generally 841×1189 millimeters or 33.11× 46.81 inches), which usually requires significant machine resources, and long load times as the full model must be loaded from the database.

Accordingly, enhanced file loading and displaying methods are needed for 3D design data and annotation including labels, dimensions, and other 2D elements, that minimize the memory footprint and allow faster loading of larger files, while allowing the user to have a expedited view of the file' content.

SUMMARY

Some embodiments of the system are directed to minimizing computer resources, such as memory and processor bandwidth, when executing processor executable code comprising two-dimensional (2D) and/or three-dimensional (3D) rendering software, collectively referred to as rendering software herein. In some embodiments, the rendering software can create a 2D and/or 3D model. In some embodiments, the 2D model is a 2D drawing model representative of a 3D model. In some embodiments, the 2D model is a 2D drawing model representative of one or more structures. In some embodiments, the structures represent parts of an industrial facility, such as a manufacturing plant, engine room, a ship's hull, pumps, pipes, walkways, electrical wires and/or conduits, as non-limiting examples. In some embodiments, the rendering software comprises processor executable code (i.e., instructions) that allows for manipulation of one or more model attributes. In some embodiments, model attributes comprise one or more annotations, geometry manipulations, dimensions, scales, measurements, and/or manipulations of one or more views of the 2D and/or 3D model. For simplicity's sake, components (i.e., modules) of the rendering software that facilitate the manipulation of these attributes will be refer to by their root name and function (e.g., annotator, scaler, measurer, manipulator, etc. Those of ordinary skill would realize that the rendering software comprises many more features than those listed in this disclosure and that the system is integratable into any rendering software.

In some embodiments, the 2D and/or 3D model is loaded into memory together with the at least a portion of the rendering software upon selection of a model file. In some embodiments, it takes a noticeable amount of time for the 2D and/or 3D model to appear in a display. In some embodiments, the delay is due to the amount of computer resources needed to execute instructions causing the rendering software to load into memory and execute using the processor. In some embodiments, the 2D and/or 3D model comprises large amounts of data (e.g., gigabytes), and the models themselves take time to load into memory. In some embodiments, this can be problematic as a user may not know the contents of a file (or multiple files) by simply looking at the extension: this makes opening each model file to view its contents a time consuming and frustrating task in the face of time sensitive situations according to some embodiments.

Some embodiments of the present disclosure seek to improve computer resource usage and a user's experience by limiting the amount of rendering software components and model attributes that are loaded upon file selection according to some embodiments. In some embodiments, the system has a significant improvement on system performance, evidenced at least in part by the reduction in memory needed to view the contents of a model file. In some embodiments, the system implements a unique system of what is commonly referred to as lazy loading. In general, lazy loading refers to hiding or not executing portions of a program or file before that portion is needed according to some embodiments. In some embodiments, this contrasts with eager loading where all model data and rendering software components are loaded upon selection of a model file. While lazy loading is a general term used in the software arts, it's implementation is specific to each software application and the impact on computer performance is a product of the developers' skills according to some embodiments.

Some embodiments of the lazy loading configuration enable a user to view model file content without the system loading all software, aspects, and/or attributes associated with the 2D or 3D model. In some embodiments, upon selection of a model file, the system is configured and arranged to load a 2D drawing model including at least one model structure. In some embodiments, the system is configurable not to generate the 2D drawing model upon execution of the model file. Instead, in some embodiments, the system is configurable to load a picture representing the 2D drawing model upon selection of the model file. In some embodiments, the system is also configured to not load some or all of the rendering software components upon selection of the model file. For example, in some embodiments the system can be configured to not load the rendering software or the 2D and/or 3D model, and instead load a picture representing the 2D and/or 3D model. In some embodiments, upon selection of the model file the system can be configured to show the picture of the 2D and/or 3D model while the rendering software and/or the 2D and/or 3D model is loading. In some embodiments, the picture appears in a new window and/or in a different portion of the display than the 2D and/or 3D model is configured to appear. In some embodiments, the picture appears in the same portion of the display that the 2D and/or 3D model is set to appear. In some embodiments, the picture only shows a "light weight" representation of a 2D and/or 3D model view. In some embodiments, as non-limiting examples, the picture can be one or more of a line or wire picture, a solid picture, a colored picture, and/or a picture that does not show attributes associated with the model. In some embodiments, the picture is indistinguishable from a view of the 2D and/or 3D model. In some embodiments, one or more attributes shown in the last saved 2D and/or 3D model view are shown in the picture. In some embodiments, the picture is the first 2D and/or 3D model view that would normally show if the lazy loading feature of the present disclosure was set to off.

In some embodiments, system is configured to load one or more portions and/or components of the rendering software upon selection of the model file. In some embodiments, system is configured not to load one or more portions of the rendering software upon selection of the model file. Instead, in some embodiments, the system is configured to only load one or more components of the rendering software after the picture has been interacted with in some respect. In some embodiments, the system is configured to only load one or more components of the rendering software after a preset period of time. In some embodiments, the system only loads those components of the rendering software that satisfies a user's interaction request. In some embodiments, an interaction with the picture results in the picture being removed from memory and replaced by the 2D and/or 3D model. In some embodiments, some model attributes and rendering software components are loaded with the replaced model, while other model attributes (e.g, annotations, measurements, etc.) and rendering software components (e.g., annotator, measurer, etc) are not loaded. In some embodiments, the picture is not loaded upon selection of a model file or view, and the 2D and/or 3D model is loaded without one or more components of the rendering software and/or without one or more model attributes.

In some embodiments, a 2D drawing can have multiple views. In some embodiments, the multiple views can all be a part of the same model file. According to some embodiments, one or more multiple views are not loaded until selected. In some embodiments, lazy loading is applied to each opened view.

In some embodiments, the lazy loading feature is completely customizable. In some embodiments, customizing the lazy loading feature requires manipulation of code. In some embodiments, customizing the lazy loading feature involves manipulation of a toggle switch, check box, voice command, or any other user executable input. For example, in some embodiments, a user can choose which attribute, if any, to show with the picture. In some embodiments, the user can choose which components of the rendering software are loaded upon a model file selection. In some embodiments, the user can configure the system to apply some arrangement of lazy loading to each view of a model.

In some embodiments, the system is configured to keep all models, pictures, and/or views in memory once opened. In some embodiments, the system deletes one or more 3D and/or 2D models, pictures, and/or views stored in memory upon selection of a new model file. In some embodiments, the system deletes one or more models, pictures, and/or views stored in memory upon selection of a new view.

DESCRIPTION OF THE DRAWINGS

FIG. 1 illustrates a computer system enabling or comprising the systems and methods in accordance with some embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. The term "substantially" includes a range that is ±10% of the associated limitation's unit of measure and/or scale.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments include a system for managing access to a computer readable recording medium that stores data, including, but not limited to computer-aided design ("CAD") data. In some embodiments, the system can comprise memory in the form of a non-transitory computer readable medium and one or more processors coupled to an online network and/or an internal network. In some embodiments, the memory can include computer-executable instructions that when executed by the processor or processors, control an exchange of CAD data (e.g., loading and/or saving) and/or rendering software. Some embodiments include a system that controls access and loading of one or more data files comprising or related to CAD data, including, but not limited parts data, and assembly data. In some embodiments, the data can include data or code that can be used to alter and/or manipulate a 3D (three-dimensional) and/or a 2D (two-dimensional) model's attributes. In other embodiments, the data or code can be used to encode color, texture, type of material into the model. In some embodiments, the encoded data can include information on light sources, cameras, peripheral objects, scene information, animation information, and/or version information. In some embodiments, CAD data can be used to render a 2D (two-dimensional) drawing of a 3D model. In some embodiments, CAD data can be used to render multiple drawing views of a model. In some embodiments, CAD data includes model attributes and drawing attributes. In some embodiments, attributes include dimensions, annotations, geometry, colors, textures, material type, scaling animations, calculations, and the like.

In some embodiments, a user's design or project can be stored or maintained in a plurality of model files. In some embodiments, the system can control access to and/or control saving to the plurality of files, while managing the locations of the model files, their structure, content, and/or inter-relationship, while managing one or more displays based on one or more of the model files.

Some embodiments enable users to preview a portion of a drawing and/or model and to review the drawing and/or model at a limited or reduced resolution and/or file size. In some embodiment, the system can save time accessing and/or opening a drawing and/or one or more drawing files associated with model, while saving computer machine resources. In some embodiments, lazy loading is used to achieve the reduced file size and/or resolution. In some embodiments, lazy loading includes first presenting a picture of a 2D drawing sheet, 2D drawing view, or 3D model view upon selection of the model file. In some embodiments lazy loading or eager loading is a selectable option. In some embodiments, one or more of a 2D drawing sheet, 2D drawing view, or 3D model view can be assigned to execute lazy loading or eager loading upon selection and configuration.

In some embodiments eager loading calls all components for the system needed to execute all CAD data associated with a 2D and/or 3D model. In some embodiments lazy loading is a term used to defer execution of portions of the system until they are needed. In some embodiments, lazy loading includes loading a picture representing a 2D and/or 3D model on a display before rendering software is loaded into the system's memory and/or used by the system's one or more processors.

In some embodiments, the system can enable a user to load portions of a model, drawing, and/or drawing file in phases. For example, in some embodiments, the system can enable a user to load a portion of a model, design graphic, drawing, and/or drawing file at a first specific time, or over a first period of time, and then load a portion of another model, design graphic, drawing, and/or drawing file at second specific time, or over a second period of time.

In some embodiments, when a user opens a model file, drawing file, drawing sheet, or graphic file comprising information from a 2D and/or 3D model, the system can be presented with a "light weight" version of the drawing file, drawing sheet, or graphic file or 2D and/or 3D model. In some embodiments, a "light weight" version can comprise one or more of a 2D and/or 3D model's geometry, color, texture, type of material, light sources, cameras, peripheral objects, scene information, animation information, and/or version attributes. In some embodiments, once at least a portion of the information is processed to a displayed image or partial image, the user can determine if the model is the correct model, drawing file, drawing sheet, or graphic file before loading the "full intelligence." In some embodiments, "full intelligence" includes all of the rendering software components and model attributes. In some embodiments, rendering software is that part of the system that allows for rotation, annotation, calculation, measurements, and/or the assignment of one or more attributes of a model and/or drawing, among other functions. In some embodiments, the system displays a "light-weight" version of the 2D and/or 3D model, drawing file, drawing sheet, or graphic file. In some embodiments, the system accomplishes a light-weight representation by using "lazy loading." In some embodiments, using a lazy loading technique, drawing sheets, models, and/or other data can load more quickly while using less machine resources than when loading all data for a scene or image (i.e., eager loading). In some embodiments, a picture representation of the drawing and/or model is displayed to the user as it is loaded.

In some embodiments, when a model file is initially opened, the system can display one or more bitmaps (i.e., pictures, images) representative of the drawing. In some embodiments, an image format can be used that comprises a lower resolution than the actual model view. In some embodiments, when a model file is initially opened, the system can display one or more bitmaps without any of the system resources that is required to work with the model file, thereby reducing the required quantity of data. In some embodiments, the bitmap does not include annotations or dimensions associated with the drawing view. In some embodiments, the bitmap does include annotations or dimensions associated with the drawing view, but does not include drawing manipulation capabilities. In some embodiments, when the bitmap is manipulated (e.g., by a user interacting with an interface such as a mouse or touchscreen) at least a portion of the rendering software is loaded. In some embodiments, when a portion of rendering software is loaded, the bitmap picture is replaced with the full drawing and/or model. In some embodiments, a zoom feature allows a portion bitmap picture to fill the boundaries of a display. In some embodiments, bitmap pictures of annotations, dimensions, or other attributes of the drawing and/or model can be displayed as part of the picture either before or after a zoom feature is executed. In some embodiments, attributes can be overlaid or integrated into the picture. In some embodiments, loading 2D and/or 3D model attributes as bitmap pictures allows for each attribute to be selected (i.e., "toggled") on and off in the bitmap (or other file type) image.

In some embodiments, the system can load all drawing views when a drawing and/or model is selected. In some embodiments, the system can access and load one or more drawing views, while keeping other drawing views in an unloaded state. In some embodiments, when the user begins work on one or more drawings and/or models, the user can, at any time, choose to load one or more other views, and the application can be configured in such a way that it can only open one view at a time before unloading the last recently loaded view from memory. In some embodiments, this allows the memory footprint and processor burden to be kept to a minimum.

In some embodiments, when a drawing or model is loaded and a different view is selected, the system first presents the bitmap picture of the view. In some embodiments, displaying the picture of the view allows a user to verify the view without loading rendering software as described above. In some embodiments, displaying the picture of the view saves memory and processor resources. In some embodiments, bitmap pictures of annotations, dimensions, or other attributes can be displayed as part of the view. In some embodiments overlaid and/or integrated portions of pictures of attributes can be toggled on and off without loading components of the rendering software.

It should be understood that Bitmap® (BMP) can be used for image display in some embodiments where uncompressed image files are desired. However, in some embodiments, a picture of the drawing and/or model can be displayed using any other image format. Example image formats compatible with the system include Joint Photographic Experts Group (JPEG), Exchangeable image file format (Exif), Tagged Image File Format (TIFF), Graphics Interchange Format (GIF), Portable Network Graphics (PNG), Better Portable Graphics (BPG), as non-limiting examples according to some embodiments. It should also be understood that the system is executable using any type of 3D file formats according to some embodiments. In some embodiments, non-limiting examples of 3D file formats include Standard Tessellation Language (STL), Object (OBJ), Filmbox (FBX), COLLAborative Design Activity (COLLADA), Three Dimensional Screens (3DS), Initial Graphics Exchange Specification (IGES), and Standard for the Exchange of Product Data (STEP).

In some embodiments, the lazy loading can be configurable. In some embodiments, the lazy loading technology can be activated and deactivated by the user at any time. In some embodiments, 2D and/or 3D models and/or drawing sheets can be fully loaded including full intelligence all at once.

In some embodiments, the system, which includes all processors, processor executable instructions, and memory (i.e., a non-transitory computer readable medium) disclosed herein, can be accessed by hardware and software located at an onsite facility. In some embodiments, the system can be accessed from a remote location (i.e. the cloud). In some embodiments, the system can run in a hybrid configuration at both the onsite location and from the cloud. In some embodiments, the onsite or cloud hybrid locations can operate independently and/or in tandem with each other. In some embodiments, after a connection loss between the onsite and cloud locations changes to models and system settings made in one location is copied to the other location so that both locations have data that is synced and matched after communication has been restored.

In some embodiments, configuring the system as a hybrid system offers a number of solutions to the problems faced in industry today. In some embodiments, the ability to have access to the same system tools from both an onsite server and a cloud based server increases process robustness. In some embodiments, a hybrid configuration has the benefit of bandwidth conservation. For example, in some embodiments, local servers can store a copy of the latest model and/or drawing, and changes to the model/drawing are stored on the local server and then uploaded to the cloud for permanent storage. In some embodiments, the local server can store the model data, and trickle the information to the cloud server as bandwidth becomes available. In some embodiments, the system comprises redundancy files for critical models where data loss would be catastrophic. In some embodiments, the system includes redundancy to protect the user's model changes by storing information both onsite and in the cloud.

In some embodiments, the user can take command over graphics in a user friendly and intuitive interface. In some embodiments, the system allows users to create 2D and/or 3D models and rotate images dynamically using custom rotation points. In some embodiments, animation options include assigning color, and/or adjusting the scale of objects. In some embodiments, system animation tools can comprise one or more interfaces (for touch, keyboard, and/or mouse interaction), a hyperlink, a text data link, a color, a resize, a transparency, and a position, as non-limiting examples.

In some embodiments, the system comprises import wizards. In some embodiments, the system can convert third party applications into system applications. In some embodiments, third party applications include the ability to convert one file type to the file type best suited for the system's particular application. In some embodiments, the import wizard allows the user to save time in conversion from a previously third party designed application into one or more of the system's modeling applications.

In some embodiments, the system comprises the ability to create clear, concise reports. In some embodiments, reports comprise one or more of plain text, Rich Text Format (RTF), Extensible Markup Language (XML), Portable Document Format (PDF), Hypertext Markup Language (HTML), and Comma Separated Value (CSV), and/or integration with Microsoft Office® programs. In some embodiments, non-limiting examples of Microsoft Office® programs comprise Excel®, Word®, and PowerPoint®.

In some embodiments, the system comprises the ability to use the same development environment to design and deploy projects to a wide range of platforms. In some embodiments, platforms can comprise Linux, VxWorks, Windows Embedded 7/8, Windows 7/8/10, Windows 10 IoT Enterprise (LTSB/LTSC), and Windows Server 2012/2016 editions, as non-limiting examples.

In some embodiments, the system comprises mobile access. In some embodiments, mobile access comprises an interface that allows a user to access the system's graphical interface (e.g., HMI) from any device with a browser. In some embodiments, devices with a browser usable by the system include iPads, iPhones, Android devices, and/or Windows devices, as non-limiting examples. In some embodiments, the system comprises support to integrate 3rd party web-based controls.

In some embodiments, the system comprises a symbols library. In some embodiments, the library comprises one or more of push buttons, pilot lights, tanks, sliders, meters, motors, pipes, valves and other common objects. In some embodiments, existing symbols can be modified to suit the user's needs. In some embodiments, the user can create a symbol from scratch. In some embodiments, the system also supports 3rd party symbol libraries and graphic tools.

In some embodiments, the system comprises a process model simulator. In some embodiments, the simulator optimizes 2D and/or 3D model component performance. In some embodiments, the simulator improves 2D and/or 3D model design, and offers operational analysis and/or performing engineering studies. For example, in some embodiments, the simulator is designed to perform rigorous heat and material balance calculations for a wide range of processes.

In some embodiments, the system allows the user to do one or more of the following: design new processes; evaluate alternate model configurations; modernize or revamp existing models; assess and document compliance within environmental regulations; troubleshoot and debottleneck plant processes; monitor, optimize, and/or improve plant yields and/or profitability; all of which are non-limiting examples of the system's capability.

In some embodiments, the system comprises cost estimation modeling. In some embodiments, the system comprises providing estimates at any stage in development. In some embodiments, the system can provide early phase conceptual estimates. In some embodiments, the system can provide definitive detail estimates that provide comprehensive, accurate cost evaluations along the lifecycle of a project.

In some embodiments, the system comprises capability for add-on modules. In some embodiments, add-on modules comprise modules designed to be integrated into the system. In some embodiments, the system includes the ability to create application programming interfaces (i.e., APIs) to work together with third-party software. In some embodiments, third-party software comprises licensable add-ons. In some embodiments, add-on modules extend the functionality of the system in various ways.

In some embodiments, the system comprises operation training. In some embodiments, a copy of the entire model can run a process using the simulator. In some embodiments, process changes can be made in the simulation without affecting the real process model. In some embodiments, the system can be used for one or more of the following: train operators on the user interface, run drills, provide training for new equipment and/or system upgrades, and/or any other type of training need. In some embodiments, training simulation models can be integrated into the system as the actual control interface for a factory process.

FIG. 1 illustrates a computer system enabling or comprising the systems and methods in accordance with some embodiments of the invention. In some embodiments, the computer system 210 can include and/or operate and/or process computer-executable code of one or more of the above-mentioned software modules and/or systems. Further, in some embodiments, the computer system 210 can operate and/or display information within one or more graphical user interfaces such as the GUI of FIG. 1. In some embodiments, the computer system 210 can comprise the cloud and/or can be coupled to one or more cloud-based server systems.

In some embodiments, the system 210 can comprise at least one computing device including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules (e.g., such as enterprise applications 238). In some embodiments, the software modules 238 can include server-based software, and can operate to host at least one user account and/or at least one client account, and operating to transfer data between one or more of these accounts using the at least one processor 232.

With the above embodiments in mind, it should be understood that the invention can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on computer-readable storage media within the system 210 and on computer-readable storage media coupled to the system 210. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the system 210 can comprise at least one computer readable medium 236 coupled to at least one data source 237a, and/or at least one data storage device 237b, and/or at least one input/output device 237c. In some embodiments, the invention can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, the computer readable medium 236 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 236 can transmit or carry instructions to a computer 240 and/or at least one user 231, including a router, private or public network, or other transmission device or channel, both wired and wireless. In some embodiments, the software modules 238 can be configured to send and receive data from a database (e.g., from a computer readable medium 236 including data sources 237a and data storage 237b that can comprise a database), and data can be received by the software modules 238 from at least one other source. In some embodiments, at least one of the software modules 238 can be configured within the system to output data to at least one user 231 via at least one graphical user interface rendered on at least one digital display.

In some embodiments of the invention, the computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240a coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some further embodiments, the user 231 can comprise a mobile user 231b coupled to the system 210. In some embodiments, the user 231b can use any mobile computing device 231c to wireless coupled to the system 210, including, but not limited to, personal digital assistants, and/or cellular phones, mobile phones, or smart phones, and/or pagers, and/or digital tablets, and/or fixed or mobile internet appliances.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the description herein.

We claim:

1. A rendering software system comprising:
one or more computers comprising one or more processors and one or more non-transitory computer readable media, the one or more non-transitory computer readable media including instructions stored thereon that when executed cause the one or more computers to implement:
a model file comprising a model capable of manipulation by a rendering software, the rendering software being part of the rendering software system that allows for rotation, annotation, calculation, measurement, and/or an assignment of one or more attributes of the model; and
a graphical user interface (GUI) configured to enable a user to open the model file;

wherein in response to the model file being initially selected to open and display the model, the rendering software system displaying at least:
one or more pictures of a model view of the model without loading the rendering software in response to a user selection of the model file, each of the one or more pictures being associated with a last saved model view and being individually selected to be displayed prior to the model file being initially opened, the model file being initially opened in response to a user action that is received after the display of the one or more pictures, the initial opening of the model file includes:
removing the one or more pictures from a memory and replacing the one or more pictures with the model file in the memory,
loading at least one model attribute or rendering software component, and
not loading at least one of an additional rendering software component and an additional attribute associated with the model; and
an option enabling at least one of the additional rendering software component and the additional attribute associated the model to be loaded by the rendering software; and
one or more new pictures of a new model view of new model file in response to a user selection of the new model file after the initial opening of the model file, the user selection of the new model file causing the model file to be deleted from the memory and replaced with the one or more new pictures of the new model view.

2. The rendering software system of claim 1,
wherein the rendering software system is configured to render a two-dimensional picture and/or a three-dimensional picture of the model upon selection of the model file.

3. The rendering software system of claim 1,
wherein the rendering software system is configured and arranged not to load the model and instead load the one or more pictures upon selection of the model file.

4. The rendering software system of claim 1,
wherein one or more attributes of the model are not loaded with the one or more pictures.

5. The rendering software system of claim 3,
wherein the rendering software system is configured and arranged to load the model upon an interaction with the one or more pictures.

6. The rendering software system of claim 5,
wherein the rendering software system is configured and arranged not to load at least a portion of the rendering software upon loading of the model after the interaction with the one or more pictures.

7. A rendering software system comprising:
one or more computers comprising one or more processors and one or more non-transitory computer readable media, the one or more non-transitory computer readable media including instructions stored thereon that when executed cause the one or more computers to implement:
a model file comprising a model capable of manipulation by a rendering software, the rendering software being part of the rendering software system that enables manipulation capabilities, the manipulation capabilities allowing for rotation, annotation, calculation, measurements, and/or an assignment of one or more attributes of the model; and a graphical user interface (GUI) configured to enable a user to open the model file;

wherein in response to the model file being initially selected to open and display the model, the rendering software system displaying at least:

one or more pictures of a model view of the model, the one or more pictures includes annotations and/or dimensions associated with the model view that have been individually selected to be displayed prior to the model file being initially opened but does not include the manipulation capabilities, the model file being initially opened in response to a user action that is received after the display of the one or more pictures, the initial opening of the model file includes:

removing the one or more pictures from a memory and replacing the one or more pictures with the model file in the memory, loading at least one model attribute or rendering software component, and not loading at least one of an additional rendering software component and an additional attribute associated with the model; and an option enabling at least one of the additional rendering software component and the attribute associated the model to be loaded by the rendering software; and one or more new pictures of a new model view of new model file in response to a user selection of the new model file after the initial opening of the model file, the user selection of the new model file causing the model file to be deleted from the memory and replaced with the one or more new pictures of the new model view.

8. The rendering software system of claim 7, wherein the rendering software system is configured to render a two-dimensional picture and/or a three-dimensional picture of the model upon a selection of the model file.

9. The rendering software system of claim 8, wherein the rendering software system is configured and arranged not to load the model and instead load the one or more pictures upon the selection of the model file.

10. The rendering software system of claim 9, wherein one or more attributes of the model are not loaded with the one or more pictures.

11. The rendering software system of claim 10, wherein the rendering software system is configured and arranged to load the model upon an interaction with the one or more pictures.

12. The rendering software system of claim 11, wherein the rendering software system is configured and arranged not to load at least a portion of the rendering software upon loading of the model after the interaction with the one or more pictures.

13. A rendering software system comprising:

one or more computers comprising one or more processors and one or more non-transitory computer readable media, the one or more non-transitory computer readable media including instructions stored thereon that when executed cause the one or more computers to implement:

a model file comprising a model capable of manipulation by a rendering software, the rendering software being part of the rendering software system that enables manipulation capabilities, the manipulation capabilities allowing for rotation, annotation, calculation, measurements, and/or an assignment of one or more attributes of the model; and a graphical user interface (GUI) configured to enable a user to open the model file; wherein:

in response to the model file being opened, the model is loaded and displayed with an option enabling at least one of a different view of the model and an attribute associated the model to be loaded by the rendering software;

in response to the different view of the model being selected, the rendering software system first presenting a picture of the different view without loading the rendering software, the picture being selected prior to the different view being selected; and in response to a user selection of a new model file after the initial opening of the model file, one or more new pictures of a new model view of the new model file is displayed, the user selection of the new model file causing the model file to be deleted from a memory and replaced with the one or more new pictures of the new model view.

14. The rendering software system of claim 13, wherein the rendering software system is configured to render a two-dimensional picture and/or a three-dimensional picture of the different view.

15. The rendering software system of claim 13, wherein the rendering software system is configured and arranged not to load the model and instead load the picture upon selection of the different view.

16. The rendering software system of claim 13, wherein one or more attributes of the model are not loaded with the picture of the different view.

17. The rendering software system of claim 13, wherein the rendering software system is configured and arranged to load the model upon an interaction with the picture.

18. The rendering software system of claim 13, wherein the rendering software system is configured and arranged not to load at least a portion of the rendering software upon loading of the model after an interaction with the picture of the different view.

* * * * *